3,117,948
PROCESS FOR PREPARING POLYAMIDE YARNS HAVING IMPROVED RESISTANCE TO THE LIGHT
Luigi Notarbartolo, Milan, and Luigi Ciceri, Como, Italy, assignors to Snia Viscosa Società Nazionale Industria Applicazioni Viscosa S.p.A., Milan, Italy, a company of Italy
No Drawing. Filed Nov. 14, 1960, Ser. No. 68,619
Claims priority, application Italy July 2, 1960
4 Claims. (Cl. 260—45.75)

It is known that polyamide yarns exposed to light undergo a substantial degradation which is particularly pronounced if titanium dioxide is present in the yarn as a delustering agent. The sensitivity of the yarn to the light grows with its titanium dioxide content and with contents between 0.4 and 3% by weight, degradation becomes rapid.

It has been proposed to incorporate in the polymers manganese compounds in order to reduce the catalytic effect of titanium dioxide with respect to degradation due to exposure to the light. Generally inorganic manganese salts are used, in particular phosphates, since these are stable at the temperature at which the polymer is prepared and is subsequently melted or extruded. Further, it is necessary to employ manganese compounds which do not colour the polymer significantly.

No organic manganese compounds have been used heretofore because they are very sensitive to the temperature at which polymerization is carried out and moreover they are affected by the acetic acid or other acid, generally uses as a stabilizer, namely to limit the polymer chains length. So for instance it was suggested to utilize manganese oxalate. This is stable per se at polymerization temperatures; however, it reacts with acetic acid in the presence of water forming manganese acetate, which with heat and in the presence of water becomes brown and colours the polymer.

It is an object of the present invention to provide an improved method of stabilizing the polyamides and in particular the polymer of caprolactam to the light.

The invention is characterized in that an aqueous solution of the product of reaction of a dicarboxylic organic acid and a manganese salt in stoichiometric proportions corresponding to the monobasic salt of manganese of the organic acid in question is added to the polyamide forming monomer (or solution of monomers) before polymerizing the same in a manner known per se.

Preferably adipic acid or sebacic acid is employed as an organic acid; preferably the carbonate is employed as a manganese salt, and is reacted with the dicarboxylic acid in solution under conditions in which the $CO_2$ is eliminated.

This preparation is carried out by mixing in an aqueous medium the necessary quantity of manganese carbonate and of organic acid and by heating them in such a manner that the manganese becomes fixed by the dicarboxylic acid while the $CO_2$ develops.

It has been found that it is very difficult, and not useful, to separate the monobasic salt of manganese from the solution by crystallization. If ordinary methods are used, for instance cooling the solution or adding a non-solvent miscible with water such as for instance methyl alcohol, generally a mixture of monobasic and dibasic salt together with free acid precipitates. The use of such a mixture in a polymerization wherein acids such as acetic acid are employed as chain stabilizers, causes colouring of the polymer obtained.

The quantity of solution employed, calculated as percent by weight of monobasic manganese salt with respect to the monomer to be polymerized, is preferably comprised between 0.006 and 0.08, and the best results are obtained with percentages between 0.025 and 0.035 for the salt of adipic acid, and between 0.035 and 0.05 for the salt of sebacic acid.

The solution of the reaction product of the dibasic organic salt and of the manganese salt, is added to the monomers or solutions of monomers together with the chain stabilizers, the catalysts (if required) and the delustering agents, and the polymerization is carried out in the usual manner in batch operation or continuously, viz.: when the monomer is caprolactam, by heating in the presence, at least initially, of at least 0.1% by weight of water with respect to the monomer, at temperatures of 180°–350° C., and preferably 240°–300° C., until the desired viscosity is reached (usually for 6–36 hours), the use of a pressure of 1–20 atm. being optional but the pressure being in any case discharged and, if desired but not necessarily, a reduced pressure being employed, towards the end of the reaction;

When the monomer is the adipate of hexamethylenediammonium or metaxylylenediammonium, by heating initially in the presence of enough water to render the reaction mass fluid (preferably 30%–60% by weight of the monomer), in a closed vessel, at temperatures of at least 180° C. and preferably 180–240° C. and preferably at pressures of 2–20 atm., preferably until a substantial equilibrium has been reached by formation of a relatively low molecular weight polymer, and subsequently discharging the pressure built up in the closed vessel and continuing heating at temperatures of 240–350° C. and preferably 260–290° C., optionally under an inert gas stream or reduced pressure, until the desired viscosity has been reached, usually for 1–10 hours;

When the monomer is 11-aminoundecanoic acid, by heating a mixture of monomer and water, the latter being 10–300% and preferably 20–60% by weight of the monomer, in a closed vessel and temperatures of 150–230° C. and preferably at pressures of 3–15 atm., preferably until a substantial equilibrium has been reached by formation of a relatively low molecular weight polymer, and subsequently discharging the pressure and continuing heating at temperatures of 190–320° C. and preferably 230–280° C., optionally under an inert gas stream or reduced pressure, until the desired viscosity has been reached, usually for 2–15 hours; or by forming a solution or suspension of the monomer in water, atomizing the same, quickly evaporating the water thereof by contact with surfaces heated to at least 180° C., causing the formation of a relatively low molecular weight polymer, and then completing the condensation as hereinbefore set forth.

One obtains white polymers which yield yarns stable to the light even with high contents (2 to 3%) by weight of $TiO_2$ as delustering agent.

The invention will be more fully understood with the aid of the following examples given without limitation:

*Example 1*

Into a 20 litre autoclave there are introduced 13 kg. of caprolactam, 600 g. of water, 20 g. of glacial acetic acid, 58.5 g. of anatase type titanium dioxide and 100 cc. of an aqueous solution containing 4.07 g. calculated as monobasic manganese adipate, obtained by reacting in the hot till complete evolution of the carbon dioxide, an aqueous solution of 3.45 g. of adipic acid with 1.36 g. of freshly prepared manganese carbonate.

The autoclave is brought in the course of 2 hours to a temperature of 260° C., while venting the steam progressively, and is kept at that temperature, at atmospheric pressure, for 14 hours, under stirring. At that time, by means of vacuum, the autoclave is brought progressively in two hours to a residual pressure of 250 mm. Hg. The polymer formed is then extruded by inert gas pressure, and is then cooled and cut to regular chips.

The polymer obtained appears perfectly white and has a relative viscosity in sulfuric acid solution (1% concentration) of 2.65. After elimination of the residue monomer by washing and after drying, the polymer is spun on spinning head provided with a melting grid in the counts 15 den. monofilament and 30 den. six filaments.

The stability to the light was determined by the tenacity drop found in ribbons washed and set prepared from the yarn to be tested, after exposure to the light in a Fade-Ometer apparatus of the Atlas Electric Devices Co., Chicago, under the conditions established by the ASTM Standards on Textile Materials, Designation D506, 50T, Edition 1951, pages 174 and ff.

The stability to the light of the yarns obtained from this polymer is very good. After 100 hours of exposure to the Fade-Ometer, the average percent tenacity drop is 4% for the 15/1 count and 5% for the 30/6 count, while the yarn of a polymer obtained under the same conditions but without the addition of monobasic adipate of manganese, shows after 100 hours' exposure an average tenacity drop of 43% for the 15/1 count and 57% for the 30/6 count.

*Example 2*

The operations of Example 1 are repeated, but employing as an opacizing agent 26 g. (2% by weight of the monomer) of anatase type titanium oxide.

The polymer obtained appears perfectly white and has a relative viscosity in solution of sulfuric acid of 2.84.

The average percent tenacity drop of the yarns obtained from this polymer, after 100 hours' exposure in the Fade-Ometer under the conditions described in Example 1, is 5% for the 15/1 count and 9% for the 40/10 count against an average decrease of 41% for the 15/1 count and of 70% for the 40/10 count found in yarns from a polymer obtained in the same conditions but without addition of monobasic adipate of manganese.

*Example 3*

The operations of Example 1 are repeated, but employing as an opacizing agent 58.5 g. of titanium oxide type anatase. This type of $TiO_2$ is a product of British Titan Products treated in a particular manner to improve its resistance to the light.

The polymer obtained appears perfectly white and has a relative viscosity in sulfuric acid solution of 2.72.

The average percent tenacity drop of the yarns obtained with that polymer after 100 hours' exposure in the Fade-Ometer under the conditions described in Example 1, is 2% for the 15/1 count and 4% for the 30/6 count against an average decrease of 29% for the 15/1 count and of 42% for the 30/6 count found in yarns from a polymer obtained under the same conditions but without the addition of monobasic manganese adipate.

*Example 4*

The operations of Example 1 are repeated, but using as an opacizing agent 58.5 g. of Unitane 0/310 type titanium dioxide. That type of titanium compound is a product of American Cyanamid Corp. treated in a particular manner to improve its resistance to the light.

The polymer obtained appears perfectly white and has a relative viscosity in sulfuric acid solution, of 2.69.

The average percent tenacity drop of the yarns obtained with that polymer after 100 hours' exposure in the Fade-Ometer under the conditions described in Example 1, is 1% for the 15/1 count and 3% for the 30/6 count against an average decrease of 25% for the 15/1 count and of 38% for the 30/6 count found in yarns from a polymer obtained under the same conditions but without the addition of monobasic manganese adipate.

*Example 5*

The operations of Example 1 are repeated, but employing as a stabilizer against light 300 cc. of a hot aqueous solution (at 90° C.) containing 5.97 g. of monobasic manganese sebacate, obtained by reacting till complete evolution of $CO_2$, a boiling aqueous solution of 5.25 g. of sebacic acid with 1.36 g. of freshly prepared manganese carbonate.

The polymer obtained appears perfectly white and has a relative viscosity in sulfuric acid solution of 2.71.

The average percent tenacity drop of the yarns obtained from this polymer after 100 hours' exposure in the Fade-Ometer under the conditions described in Example 1, is 5% for the 15/1 count and 6% for the 30/6 count, a substantially better result than obtained in the yarns made from the polymer prepared without addition of the monobasic manganese sebacate (see Example 1).

*Example 6*

Into a 20 litre autoclave, there are introduced 8 kg. of hexamethylene diammonium adipate containing 0.32% by weight of acetic acid, 0.45% by weight of anatase type titanium dioxide, 4.450 kg. of distilled water and 61.5 ml. of an aqueous solution containing 2.50 g. of monobasic manganese adipate prepared as described in Example 1.

The autoclave is brought up to 110° C. eliminating by distillation 50% of the water introduced, then the temperature is raised for about 1 hour to 180° C. at a pressure of 5 atm. The temperature is further raised to 250° C. while keeping the pressure at 5 atm. by degassing. Then the pressure is progressively decreased in 1 hour to atmospheric pressure while the mass is brought to a temperature of 275° C. and the same is kept then under stirring for 2 hours under those conditions.

At that time, by application of vacuum, the autoclave is brought progressively in 1 hour to a residual pressure of a few mm. Hg and is kept thus for a further half hour. Finally pressure is restored by means of dry inert gas and the polymer formed is extruded, cooled and cut to regular chips.

The polymer obtained appears perfectly white and has an intrinsic viscosity in metacresol solution, of 1.12.

The average tenacity decrease of the yarns obtained from this polymer after 100 hours' exposure in the Fade-Ometer under the conditions described in Example 1, is 4% for the 15/1 count and 6% for the 30/6 count; against an average decrease of 32% for 15/1 count and of 48% for the 30/6 count as found in yarns from a polymer obtained under the same conditions, but without addition of monobasic manganese adipate.

*Example 7*

The operations of Example 6 are repeated, but employing as a monomer 8 kg. of metaxylylenediammonium adipate.

Polymerization is conducted according to the cycle described in Example 6 for hexamethylene-diammonium adipate.

The polymer obtained appears perfectly white and has an intrinsic viscosity in metacresol solution, of 0.96.

The average tenacity decrease of the yarns obtained from this polymer after 100 hours' exposure in the Fade-Ometer under the conditions described in Example 1, is 6% for the 15/1 count and 8% for the 30/6 count; against an average decrease of 52% for the 15/1 count and of 58% for the 30/6 count as found in yarns from a polymer obtained under the same conditions but without any addition of monobasic manganese adipate.

*Example 8*

The operations of Example 5 are repeated, but employing as a monomer 13 kg. of 11-amino undecanoic acid containing 0.28% by weight of acetic acid, 58/5 g. (0.45% by weight) of anatase type titanium dioxide, 4.250 kg. of distilled water and 300 ml. of a warm (90° C.) aqueous solution containing 5.97 g. calculated as monobasic manganese sebacate and obtained as described in Example 5.

The autoclave is brought to 180° C. and to 8 atm. of pressure in about 2 hours. The temperature is further raised while keeping the pressure at 8 atm., by degassing, up to 225° C. Then the pressure is decreased to atmospheric pressure progressively in 2 hours, bringing the mass to a temperature of 260° C. and thereafter keeping it under stirring for 4 hours under those conditions. At that time a slight stream of inert gas is passed into the autoclave for half an hour and finally the polymer formed is extruded, cooled down and cut to regular chips.

The polymer obtained appears perfectly white and has an intrinsic viscosity in metacresol, of 1.03.

The average tenacity decrease of the yarns obtained from this polymer, after 100 hours' exposure in the Fade-Ometer, under the conditions described in Example 1, is 3% for the 15/1 count and 4% for the 30/6 count; against an average decrease of 33° for the 15/1 count and of 42% for the 30/6 count as found in yarns from a polymer obtained under same conditions, but without the addition of monobasic manganese sebacate.

We claim:

1. A process for the preparation of light-stable, color-free polyamides, comprising the step of carrying out the polymerization of the polyamide forming monomers in the initial presence of between 0.006% and 0.08% by weight, based on the monomers, of monobasic manganese salts chosen from the group consisting of the monobasic manganese salt of adipic acid and the monobasic manganese salt of sebacic acid.

2. A process for the preparation of light stable, color-free polyamides, comprising the step of carrying out the polymerization of the polyamide forming monomers in the initial presence of between 0.025% and 0.035% by weight, based on the monomers, of the monobasic manganese salt of adipic acid.

3. A process for the preparation of light-stable, color-free polyamides, comprising the step of carrying out the polymerization of the polyamide forming monomers in the initial presence of between 0.035 and 0.05% by weight, based on the monomers, of the monobasic manganese salt of sebacic acid.

4. A process for preparing light-stable polyamides, comprising adding to a polyamide forming monomer before polymerization, an aqueous solution of the product of reaction of a dicarboxylic organic acid and of a manganese salt in stoichiometric proportions corresponding to the monobasic manganese salt of the organic acid in question, and wherein said dicarboxylic organic acid is selected from the group consisting of adipic acid and sebacic acid.

References Cited in the file of this patent

UNITED STATES PATENTS

| 2,887,462 | Van Oot | May 19, 1959 |
| 2,984,647 | White | May 16, 1961 |

FOREIGN PATENTS

| 955,259 | France | Jan. 9, 1960 |